United States Patent
Akimatsu (10) Patent No.: US 9,648,185 B2
(45) Date of Patent: May 9, 2017

(54) IMAGE READING APPARATUS

(71) Applicant: Brother Kogyo Kabushiki Kaisha, Nagoya-shi, Aichi-ken (JP)

(72) Inventor: Takayuki Akimatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/009,166

(22) Filed: Jan. 28, 2016

(65) Prior Publication Data
US 2016/0227048 A1    Aug. 4, 2016

(30) Foreign Application Priority Data

Jan. 29, 2015  (JP) ................................. 2015-015892

(51) Int. Cl.
H04N 1/04   (2006.01)
H04N 1/00   (2006.01)

(52) U.S. Cl.
CPC ....... *H04N 1/0057* (2013.01); *H04N 1/00551* (2013.01); *H04N 1/00559* (2013.01)

(58) Field of Classification Search
None
See application file for complete search history.

(56) References Cited

U.S. PATENT DOCUMENTS

| | | | |
|---|---|---|---|
| 8,149,476 B2 | 4/2012 | Hamada et al. | |
| 8,654,356 B2 * | 2/2014 | Maekawa | B41J 15/042 358/1.1 |
| 8,950,743 B2 * | 2/2015 | Sakano | G03G 15/602 271/3.14 |
| 9,075,376 B2 * | 7/2015 | Utagawa | G03G 15/70 |
| 2002/0098023 A1 * | 7/2002 | Mitomi | H04N 1/0057 399/374 |
| 2009/0284808 A1 * | 11/2009 | Hamada | H04N 1/00546 358/474 |
| 2012/0170087 A1 * | 7/2012 | Nose | B65H 3/5223 358/498 |
| 2014/0125007 A1 * | 5/2014 | Sakano | G03G 15/602 271/265.01 |

(Continued)

FOREIGN PATENT DOCUMENTS

| | | |
|---|---|---|
| JP | 3571288 B2 | 9/2004 |
| JP | 4864746 B2 | 2/2012 |
| JP | 05155009 B2 | 2/2013 |

*Primary Examiner* — Dung Tran
(74) *Attorney, Agent, or Firm* — Banner & Witcoff, Ltd.

(57) ABSTRACT

An image reading apparatus includes: a first unit including a supporter and a first image reader; and a second unit. The second unit includes: a pressing member that presses a reading object onto the supporter; a contact member that contacts a conveyed sheet; a sheet holder opposed to the contact member; a second image reader disposed on an opposite side of the contact member from the sheet holder; and a cover spaced apart from the contact member at a second position. When the second unit is located at the closed position, movement of the cover to the second position is limited by the first unit, and the cover is located at a position opposed to the first unit and different from a position of the pressing member. When the second unit is located at an open position, the limitation of the movement is canceled.

12 Claims, 9 Drawing Sheets

(56) References Cited

U.S. PATENT DOCUMENTS

2015/0242716 A1* 8/2015 Kurokawa ......... H04N 1/00551
  358/1.12
2015/0281499 A1* 10/2015 Hamaguchi ........ H04N 1/00572
  358/498

* cited by examiner

IMAGE READING APPARATUS

CROSS REFERENCE TO RELATED APPLICATION

The present application claims priority from Japanese Patent Application No. 2015-015892, which was filed on Jan. 29, 2015, the disclosure of which is herein incorporated by reference in its entirety.

BACKGROUND

Technical Field

The following disclosure relates to an image reading apparatus.

Description of the Related Art

There is known an image reading apparatus including two image sensors. This image reading apparatus includes: a first unit including a flatbed (FB) reading platen provided at an upper portion of the first unit; and a second unit provided on the first unit so as to be openable and closable. The second unit includes an automatic document feeder (ADF) for conveying a sheet along a conveyance path. One image sensor of the two image sensors is provided in the first unit, and the other image sensor is provided in the second unit.

The one image sensor is reciprocable along a lower surface of the FB reading platen in a direction (a sub-scanning direction) perpendicular to a direction (a main scanning direction) in which reading elements of the one image sensor are arranged. A lower surface of the second unit is provided with a pressing member for covering the FB reading platen. For image reading using the flat bed, a user moves the second unit to its open position, then placing a reading object on the FB reading platen, and moving the second unit to its closed position, so that the reading object is held in pressing contact with the FB reading platen by the pressing member.

The other image sensor is attached at a position at which an image formed on a sheet conveyed by the ADF is readable. The second unit includes an ADF reading platen provided along a portion of a conveyance path in which the sheet is conveyed by the ADF. The other image sensor is opposed to the conveyance path, with the ADF reading platen interposed therebetween. A sheet holder is provided so as to be opposed to the ADF reading platen, with the conveyance path interposed therebetween. The sheet holder presses the sheet conveyed by the ADF, toward the ADF reading platen.

In the above-described image reading apparatus, the sheet holder is removably or pivotably provided on the second unit, and the sheet holder may be moved away from the ADF reading platen. This construction allows the user to perform maintenance for the sheet holder and the ADF reading platen.

SUMMARY

In the above-described image reading apparatus, however, when the sheet holder is moved away from the ADF reading platen, the pressing member has to be partly bent downward. Thus, the pressing member is bent each time when the user performs an operation of removing and mounting the sheet holder from and onto the second unit or an operation of causing pivotal movement of the sheet holder with respect to the second unit. As a result, the pressing member may be creased, wrinkled, or kept curled or bent, unfortunately. If the pressing member is kept curled, a degree of contact of the pressing member with the platen is locally lowered, which may deteriorate a quality of image reading.

Accordingly, an aspect of the disclosure relates to an image reading apparatus including a second unit that has an openable lower surface and capable of reducing generation of, e.g., additional curl in a pressing member provided on the lower surface of the second unit.

In one aspect of the disclosure, an image reading apparatus includes: a first unit; and a second unit mounted on the first unit and movable between a closed position and an open position. The second unit covers an upper surface of the first unit when the second unit is located at the closed position. The first unit includes: a supporter that supports a reading object; and a first image reader configured to read an image formed on the reading object supported by the supporter. The second unit includes: a sheet conveyor that conveys a sheet along a conveyance path; a pressing member that presses, onto the supporter, the reading object supported by the supporter, when the second unit is located at the closed position; a contact member that contacts the sheet conveyed by the sheet conveyor, the contact member having a first surface and a second surface that is a back of the contact member from the first surface; a sheet holder opposed to the first surface of the contact member, with the conveyance path located therebetween; a second image reader opposed to the second surface of the contact member, the second image reader being configured to read an image formed on the sheet conveyed by the sheet conveyor; and a cover movable between a first position and a second position and configured to hold the sheet holder, wherein when the cover is located at the first position, the cover covers the sheet holder and the contact member in a state in which the sheet holder is close to the contact member, and wherein when the cover is located at the second position, the sheet holder is spaced apart from the contact member. When the second unit is located at the closed position, movement of the cover to the second position is limited by the first unit, and the cover is located at a position opposed to the first unit and different from a position of the pressing member. When the second unit is located at the open position, the limitation of the movement of the cover to the second position by the first unit is canceled.

In another aspect of the disclosure, an image reading apparatus includes: a first unit; and a second unit mounted on the first unit and movable between a closed position and an open position, the second unit covering an upper surface of the first unit when the second unit is located at the closed position. The second unit includes: a sheet conveyor that conveys a sheet along a conveyance path; a contact member that contacts the sheet conveyed by the sheet conveyor, the contact member having a first surface and a second surface that is a back of the contact member from the first surface; a sheet holder opposed to the first surface of the contact member, with the conveyance path located therebetween; an image reader opposed to the second surface of the contact member, the image reader being configured to read an image formed on the sheet conveyed by the sheet conveyor; and a cover movable between a first position and a second position and configured to hold the sheet holder, wherein when the cover is located at the first position, the cover covers the sheet holder and the contact member in a state in which the sheet holder is close to the contact member, and wherein when the cover is located at the second position, the sheet holder is spaced apart from the contact member. When the second unit is located at the open position, the cover is exposed to the outside.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings. In the following description, up, down, front, rear, right, and left sides are defined as illustrated in the drawings. Likewise, an up and down direction, a front and rear direction, and a right and left direction are also defined as illustrated in the drawings.

Configuration of MFP

Figure 1:
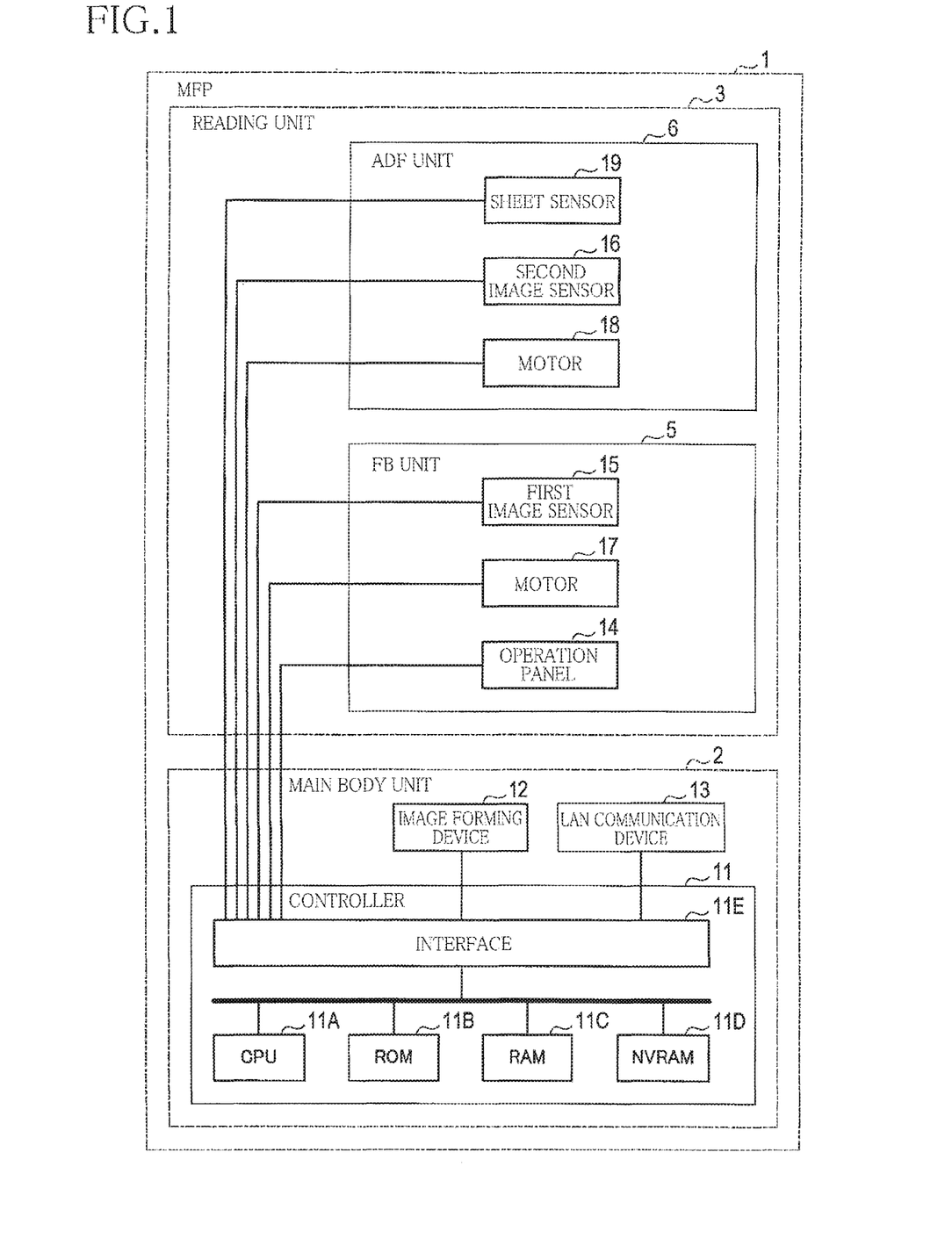
FIG. 1 is a block diagram illustrating a configuration of a multi-function peripheral (MFP)

FIG. 1 illustrates a multi-function peripheral (MFP) 1. As illustrated in FIG. 1, the MFP 1 includes a main body unit 2 and a reading unit 3 as one example of an image reading apparatus. The reading unit 3 includes a flatbed (FB) unit 5 as one example of a first unit and an automatic document feeder (ADF) unit 6 as one example of a second unit. The reading unit 3 will be described later in detail.

As illustrated in FIG. 1, the main body unit 2 is provided with a controller 11. The controller 11 includes well-known devices including a CPU 11A, a ROM 11B, a RAM 11C, an NVRAM 11D, and an interface 11E. The CPU 11A executes processings according to control programs stored in the ROM 11B and the RAM 11C to control devices and components of the MFP 1.

For example, the controller 11 controls an image forming device 12, a LAN communication device 13, an operation panel 14, a first image sensor 15 as one example of a first image reader, a second image sensor 16 as one example of a second image reader, a motor 17, a motor 18, and a sheet sensor 19. The image forming device 12, the LAN communication device 13, and the operation panel 14 are provided on or in the main body unit 2. The first image sensor 15 and the motor 17 are provided in the FB unit 5. The second image sensor 16, the motor 18, and the sheet sensor 19 are provided in the ADF unit 6.

The image forming device 12 is an ink-jet recording device which records an image on a recording medium. Specifically, the image forming device 12 includes a conveying mechanism for conveying the recording medium, a recording head for ejecting ink, and a drive mechanism for reciprocating the recording head. These devices a well known, and a detailed description and illustrations are dispensed with. It is noted that the image forming device 12 may be an electronic-photographic image recording device.

The LAN communication device 13 includes a communication interface for wireless LAN and a communication interface for wired LAN. The operation panel 14 includes: input devices to be used by a user for providing various instructions for the MFP 1; and output devices for notifying the user of information such as an operating state of the MFP 1. Examples of the input devices include a touchscreen and various kinds of buttons and switches. Examples of the output devices include a liquid crystal display and various kinds of lamps.

Each of the first image sensor 15 and the second image sensor 16 is a contact image sensor (CIS) in the present embodiment. The motor 18 is a power source for operating the first image sensor 15 and for operating the ADF unit 6 to convey a sheet. The sheet sensor 19 detects whether any one of leading and trailing edges of the sheet is conveyed at a particular detecting position by the ADF unit 6 in a conveying direction.

In the present embodiment, the sheet sensor 19 is a contact sensor which is switched between an ON state and an OFF state, depending upon whether the contact sensor is in contact with the sheet being conveyed. It is noted that the sheet sensor 19 may be a non-contact sensor capable of detecting whether any one of leading and trailing edges of the sheet is conveyed at the particular detecting position by the ADF unit 6 in the conveying direction. Examples of the non-contact sensor include: an optical sensor capable of detecting whether a light beam is intercepted by the sheet being conveyed; and an optical sensor capable of detecting whether light is reflected off the sheet being conveyed.

Detailed Configuration of Reading Unit

Figure 2:
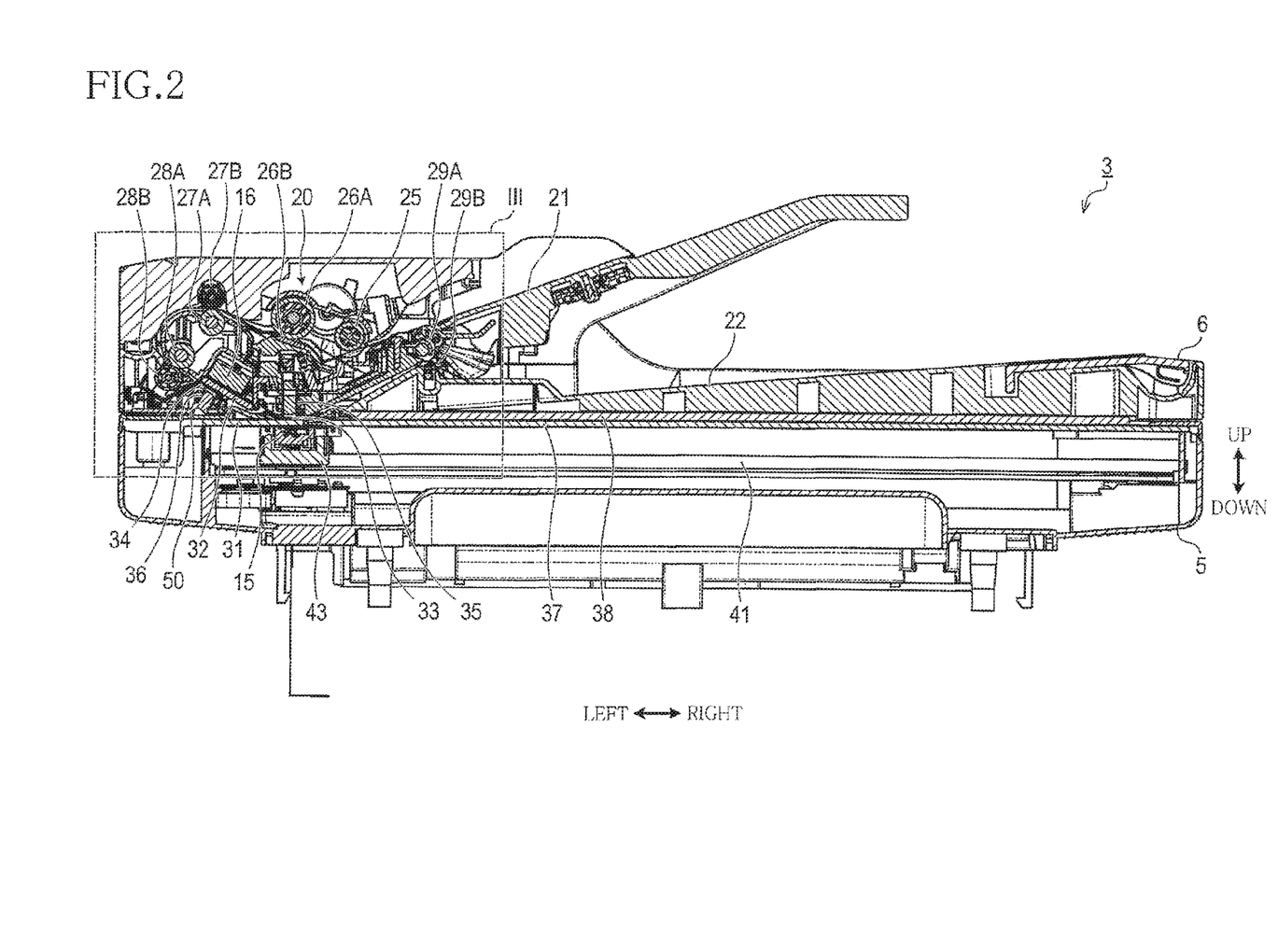
FIG. 2 is an elevational view in vertical cross section illustrating a reading unit.
Figure 3:
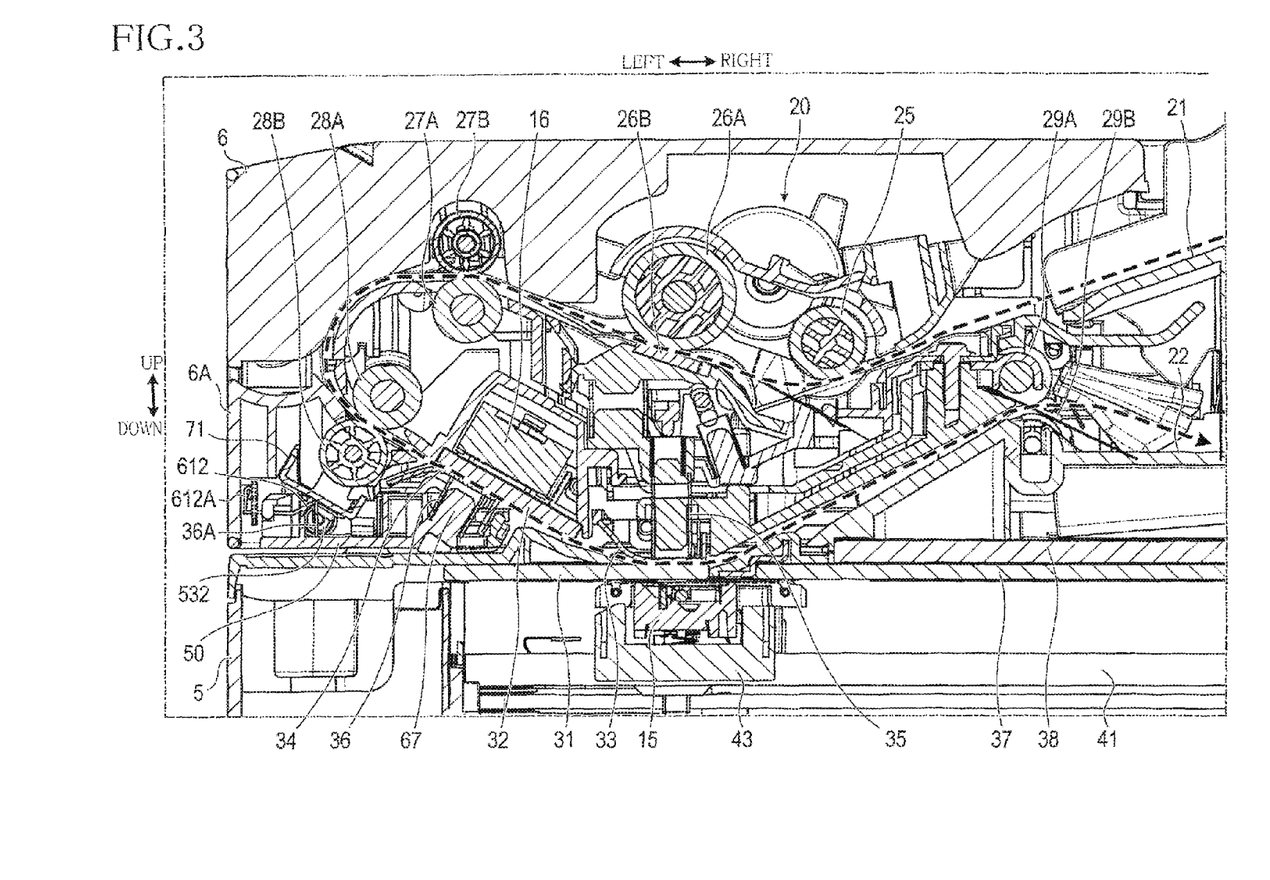
FIG. 3 is an enlarged view illustrating an area III in FIG. 2.

As illustrated in FIGS. 2 and 3, the ADF unit 6 of the reading unit 3 includes a sheet conveyor 20 which conveys the sheet along a conveyance path indicated by the broken line in FIG. 3. A supply supporter 21 is provided upstream of the sheet conveyor 20 in the conveying direction. The supply supporter 21 supports the sheet to be supplied to the sheet conveyor 20. A discharge supporter 22 is provided downstream of the sheet conveyor 20 in the conveying direction. The discharge supporter 22 supports the sheet discharged from the sheet conveyor 20.

The sheet conveyor 20 includes a supply roller 25, a separating roller 26A, a separating piece 26B, a first conveying roller 27A, a first pinch roller 27B, a second conveying roller 28A, a second pinch roller 28B, a discharge roller 29A, and a discharge pinch roller 29B.

One or more of the sheets placed on the supply supporter 21 are supplied by the supply roller 25 from the supply supporter 21 toward a downstream side in the conveying direction, and in the case where a plurality of sheets are supplied, the sheets are separated from each other by the separating roller 26A and the separating piece 26B. The sheet is further conveyed to a downstream side in the conveying direction by the first conveying roller 27A and the second conveying roller 28A and discharged onto the discharge supporter 22 by the discharge roller 29A. A curved portion of the conveyance path is defined between the first conveying roller 27A and the second conveying roller 28A.

In a state in which the ADF unit 6 is closed, a first ADF platen 31 is provided under the lowest portion of the conveyance path. A first sheet holder 33 is provided so as to be opposed to the first ADF platen 31, with the conveyance path interposed therebetween. The first sheet holder 33 is located over the first ADF platen 31 so as to be opposed thereto. A second ADF platen 32 as one example of a contact member is provided over a portion of the conveyance path which extends obliquely downward from the second conveying roller 28A toward the first ADF platen 31. A second sheet holder 34 as one example of a sheet holder is provided so as to be opposed to the second ADF platen 32, with the conveyance path interposed therebetween. The second sheet holder 34 is located obliquely below the second ADF platen 32 so as to be opposed thereto.

The first ADF platen 31 is provided in the FB unit 5. The second ADF platen 32, the first sheet holder 33, and the second sheet holder 34 are provided in the ADF unit 6. In the present embodiment, each of the first ADF platen 31 and the second ADF platen 32 is a glass plate. Each of the first sheet holder 33 and the second sheet holder 34 is a metal component such as a metal sheet component.

The first sheet holder 33 is urged toward the first ADF platen 31 by a first spring 35 in the form of a coil spring in the present embodiment. The sheet passing in contact with an upper surface of the first ADF platen 31 is pressed by the first sheet holder 33 onto the first ADF platen 31. Specifically, protrusions, not illustrated, are provided, on a surface of the first sheet holder 33 which faces the first ADF platen 31, at opposite end portions of the first sheet holder 33 in the front and rear direction. These protrusions are held in contact with the first ADF platen 31. Thus, a small clearance having the height of the protrusions is formed between the first ADF platen 31 and the surface of the first sheet holder 33 which faces the first ADF platen 31.

When the sheet is conveyed between the first ADF platen 31 and the first sheet holder 33, the first sheet holder 33 presses the sheet onto the first ADF platen 31, with the small clearance kept defined. The first spring 35 urges the first sheet holder 33 toward the first ADF platen 31 by such a force that does not interfere with the conveyance of the sheet. This operation prevents the sheet from floating up from the first ADF platen 31.

The second sheet holder 34 is urged toward the second ADF platen 32 by a second spring 36 as one example of a second urging member and in the form of a coil spring in the present embodiment. The sheet passing in contact with a support surface of the second ADF platen 32 is pressed by the second sheet holder 34 onto the second ADF platen 32. Specifically, protrusions, not illustrated, are provided, on a surface of the second sheet holder 34 which faces the second ADF platen 32, at opposite end portions of the second sheet holder 34 in the front and rear direction. These protrusions are held in contact with the second ADF platen 32. Thus, a small clearance having the height of the protrusions is formed between the second ADF platen 32 and the surface of the second sheet holder 34 which faces the second ADF platen 32.

When the sheet is conveyed between the second ADF platen 32 and the second sheet holder 34, the second sheet holder 34 presses the sheet onto the second ADF platen 32, with the small clearance kept defined. The second spring 36 urges the second sheet holder 34 toward the second ADF platen 32 by such a force that does not interfere with the conveyance of the sheet. This operation prevents the sheet from floating up from the second ADF platen 32.

The FB unit 5 includes an FB platen 37 as one example of a supporter, and the ADF unit 6 includes a pressing member 38. In the present embodiment, the FB platen 37 is a glass plate like the first ADF platen 31 and the second ADF platen 32. The pressing member 38 is constituted by a stacked body including a plastic form layer and a rigid resin film layer stacked on each other. When the ADF unit 6 is closed, the pressing member 38 presses a reading object placed on the FB platen 37, onto the FB platen 37 in a state in which the pressing member 38 is held in close contact with the FB platen 37 with slight elastic deformation. Examples of the reading object include various kinds of sheets and books as documents.

Each of the second ADF platen 32 and the second sheet holder 34 is disposed so as to be inclined with respect to an upper surface of the FB platen 37, i.e., its support surface for supporting the reading object. Thus, the conveyance path is inclined from an upper left side toward a lower right side between the second ADF platen 32 and the second sheet holder 34. Accordingly, when compared with a construction in which the conveyance path extends horizontally between the second ADF platen 32 and the second sheet holder 34, the conveyance path is short in the horizontal direction between the second ADF platen 32 and the second sheet holder 34. This construction results in reduced horizontal size of an area including the conveyance path between the second ADF platen 32 and the second sheet holder 34, resulting in reduction in footprint of the MFP 1.

The FB unit 5 includes a guide rail 41 and a carriage 43. Over an area under the first ADF platen 31 and the FB platen 37, the guide rail 41 extends in the right and left direction so as to be parallel with lower surfaces of the first ADF platen 31 and the FB platen 37.

The carriage 43 is mounted and supported on an upper portion of the guide rail 41 so as to be reciprocable in the right and left direction along the guide rail 41. This carriage 43 is coupled to a toothed belt, not illustrated. When the toothed belt is rotated by power transmitted from the motor 17, the carriage 43 is reciprocated in the right and left direction.

The first image sensor 15 is mounted on the carriage 43 and reciprocated in the right and left direction with the carriage 43. The second image sensor 16 is not moved at a position at which the second image sensor 16 is opposed to the conveyance path, with the second ADF platen 32 located therebetween. Each of the first image sensor 15 and the second image sensor 16 has a plurality of reading elements arranged in the front and rear direction.

When reading an image formed on the reading object placed on the upper surface of the FB platen 37, the first image sensor 15 reads the image while moving with the carriage 43 in a direction (a sub-scanning direction) perpendicular to a direction (a main scanning direction) in which the reading elements are arranged. When reading an image formed on the sheet conveyed by the sheet conveyor 20, the first image sensor 15 is stopped under the first sheet holder 33 and the first ADF platen 31 to read the image formed on the sheet passing in contact with the upper surface of the first ADF platen 31. Above the second sheet holder 34 and the second ADF platen 32, the second image sensor 16 reads an image formed on the sheet passing in contact with the support surface of the second ADF platen 32.

Detailed Construction of Sheet Holder

Figure 4:
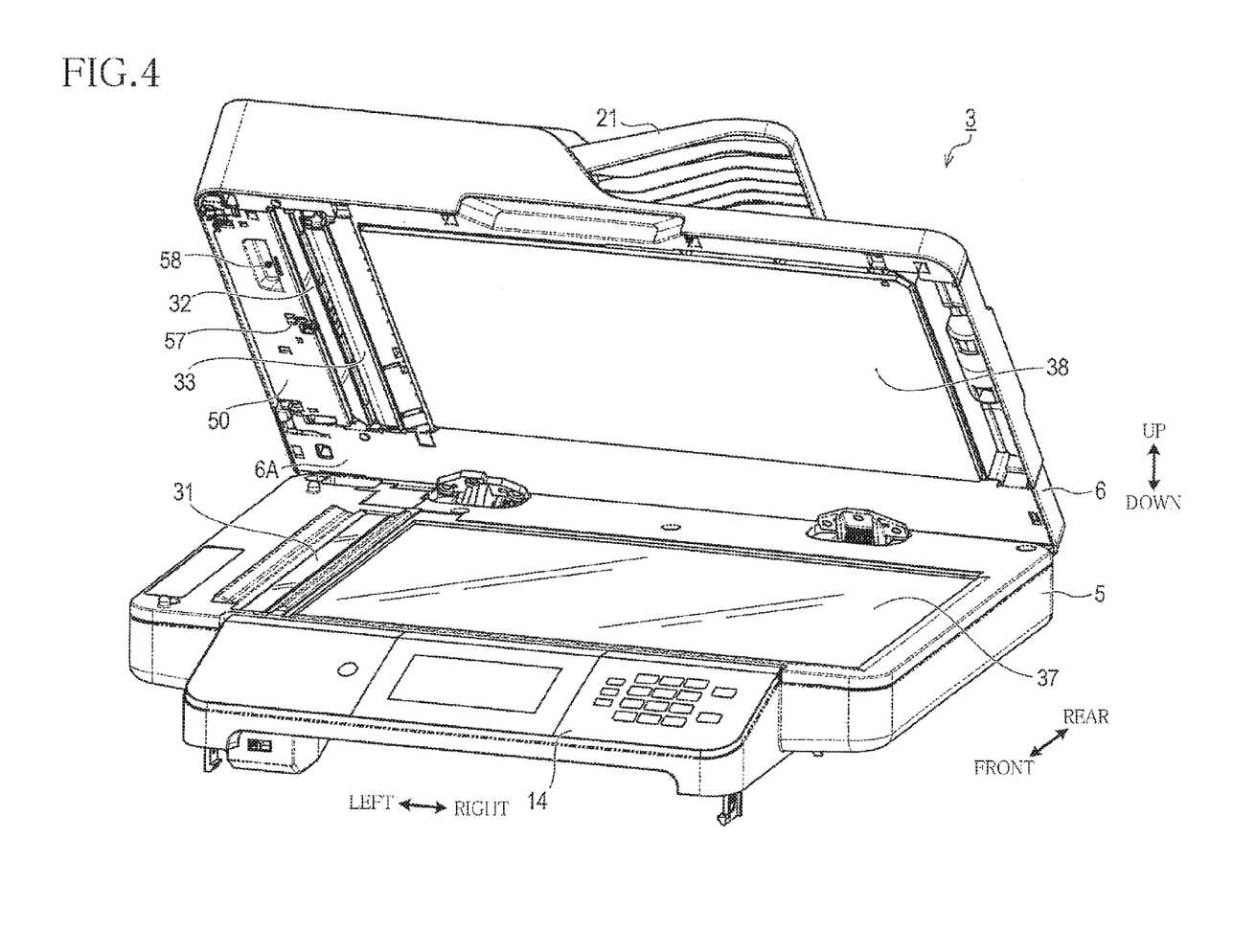
FIG. 4 is a perspective view of the reading unit.

The ADF unit 6 is pivotable with respect to the FB unit 5 between a closed position and an open position. When the ADF unit 6 is located at the closed position, as illustrated in FIG. 2, an upper surface of the FB unit 5 is covered with the ADF unit 6. When the ADF unit 6 is located at the open position, as illustrated in FIG. 4, the upper surface of the FB unit 5 and a lower surface of the ADF unit 6 are exposed to the outside of the MFP 1.

The first ADF platen 31 and the FB platen 37 are provided on the upper surface of the FB unit 5. The first sheet holder 33, the pressing member 38, and a sheet holder cover 50 as one example of a cover are provided on the lower surface of the ADF unit 6. When the ADF unit 6 is located at the closed position, the first sheet holder 33 is located just over the first ADF platen 31. When the ADF unit 6 is located at the closed position, the pressing member 38 is located just over the FB platen 37.

Figure 5:
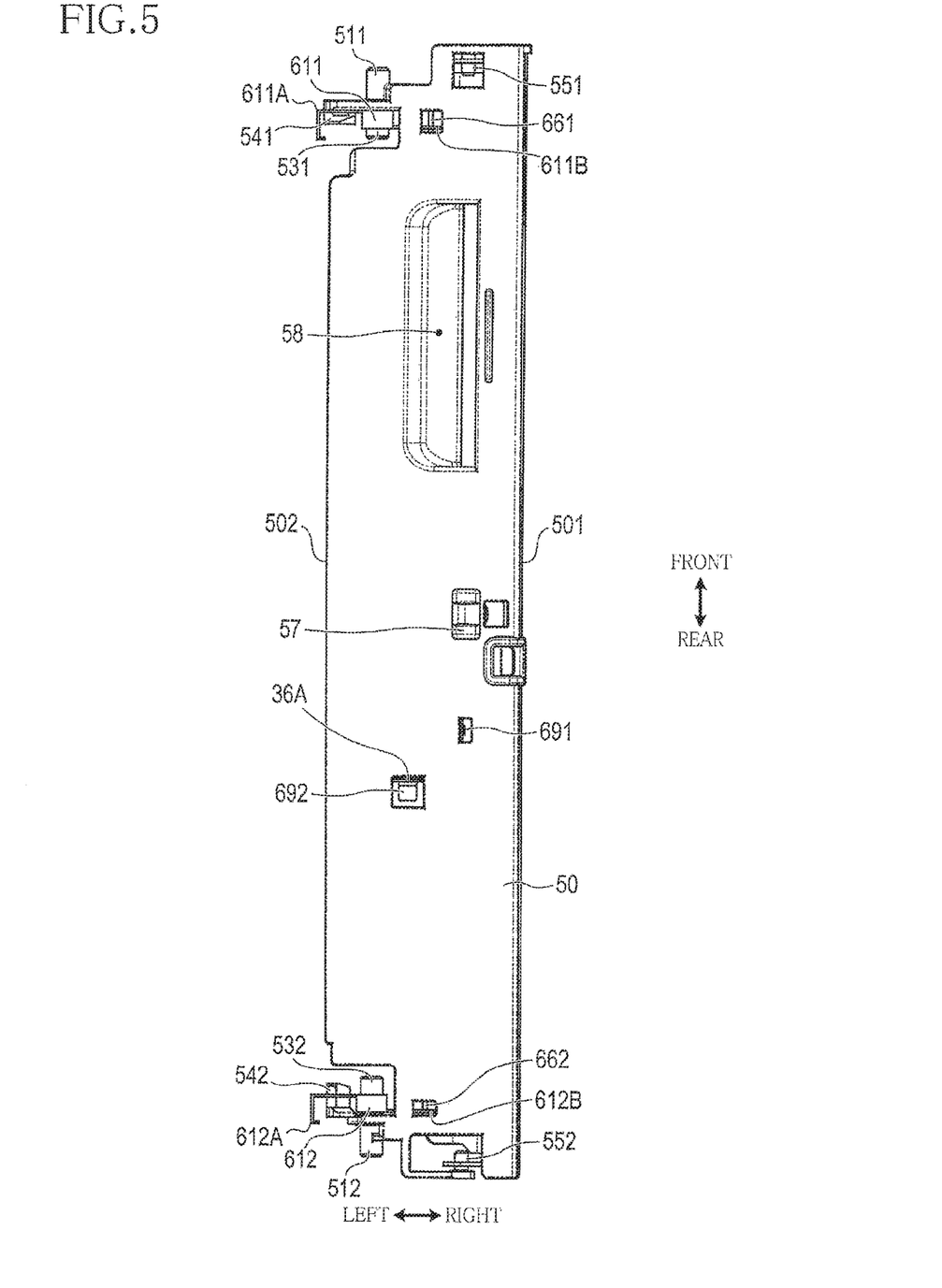
FIG. 5 is a bottom view of a sheet holder cover and other components.
Figures 6A, 6B, 6C:
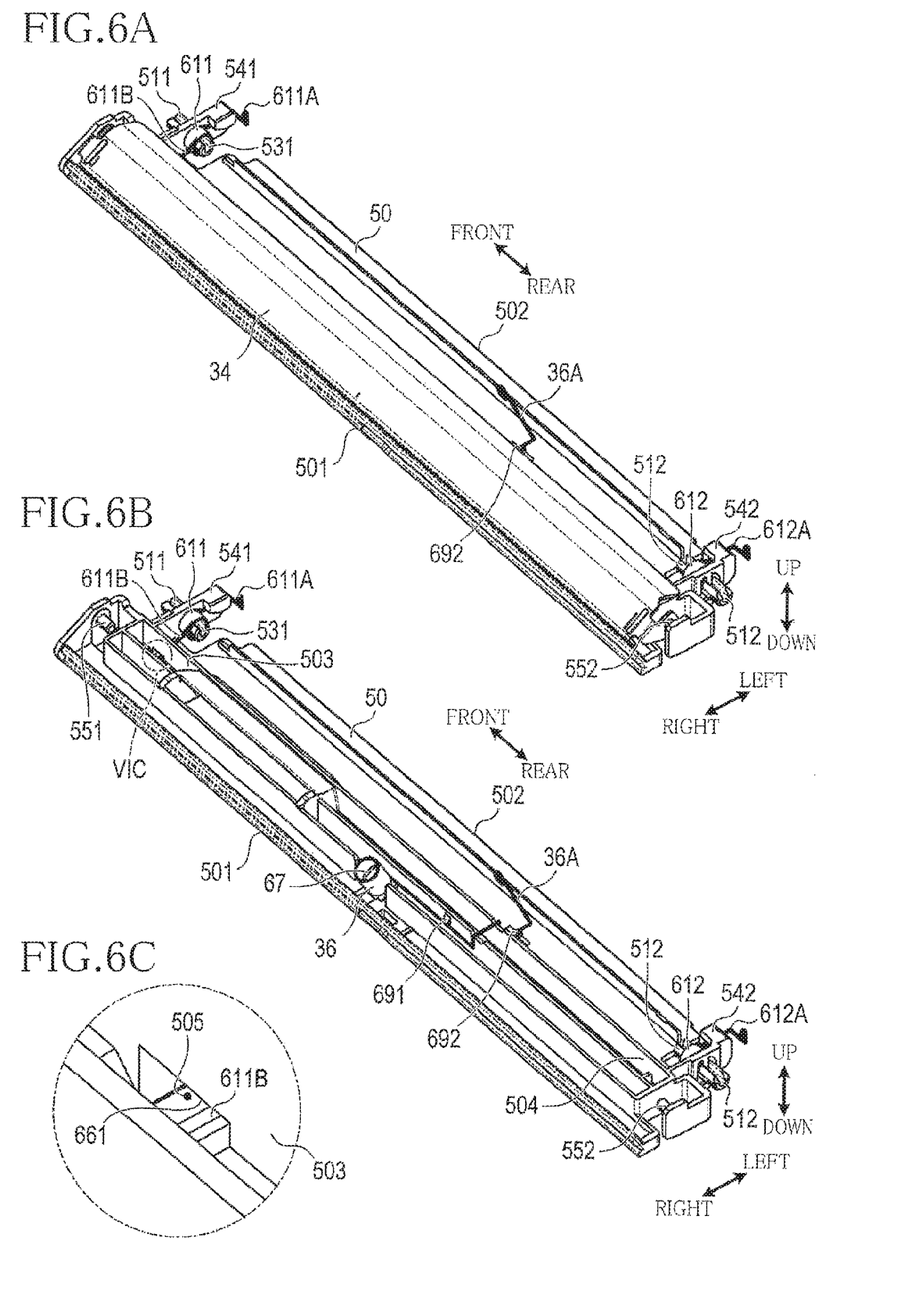
FIG. 6A is a perspective view of the sheet holder cover and other components.
FIG. 6B is a perspective view of the sheet holder cover and said other components illustrated in FIG. 6A, with a second sheet holder removed.
FIG. 6C is an enlarged view illustrating an area VIC in FIG. 6B.

When the ADF unit 6 is located at the closed position, the sheet holder cover 50 does not overlap the pressing member 38 in the right and left direction, in other words, the sheet holder cover 50 and the pressing member 38 do not overlap each other when viewed in a direction perpendicular to the upper surface of the FB platen 37. Specifically, the sheet holder cover 50 is located on an opposite side of the first sheet holder 33 from the pressing member 38. A lower surface of the sheet holder cover 50, a lower surface of the first sheet holder 33, and a lower surface of the pressing member 38 define substantially the same plane. The sheet holder cover 50 is formed of resin. As illustrated in FIGS. 5, 6A, and 6B, the sheet holder cover 50 includes pivot shafts 511, 512, first support shafts 531, 532, temporary assembly members 541, 542, second support shafts 551, 552, a protrusion 57, and a recess 58.

Figure 7A:
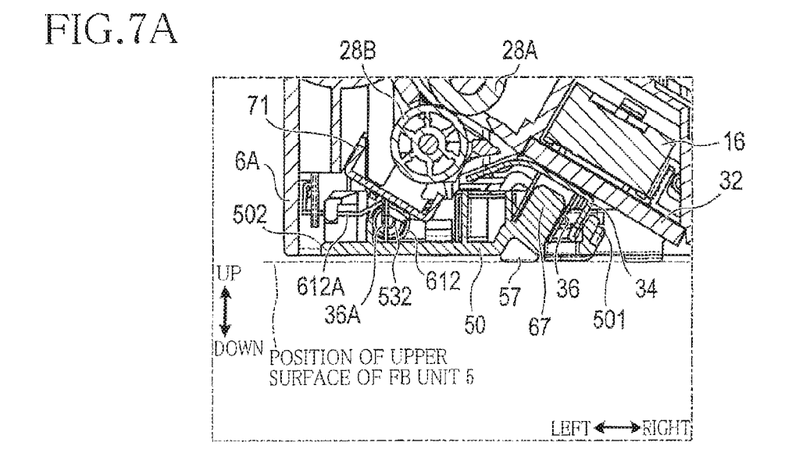
FIG. 7A is a cross-sectional view taken along a central plane of the MFP in a front and rear direction, illustrating components including the sheet holder cover located at a first position.
Figure 7B:
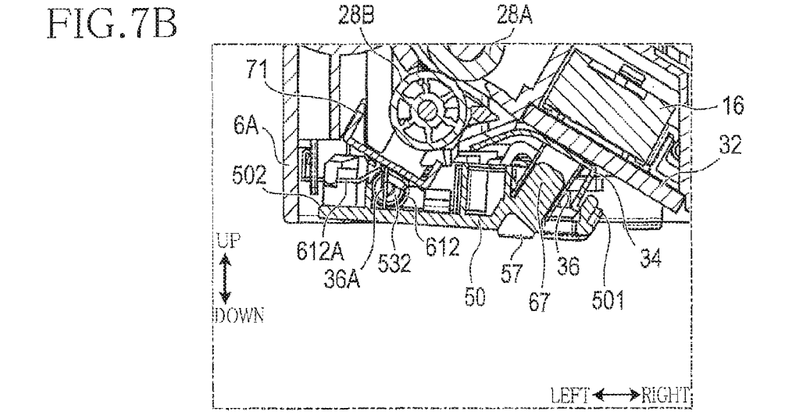
FIG. 7B is a cross-sectional view taken along the central plane of the MFP in the front and rear direction, illustrating the components including the sheet holder cover located at a third position.
Figure 7C:
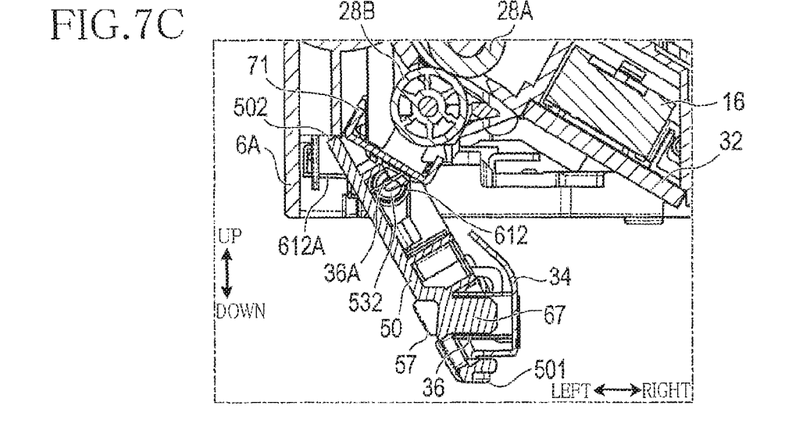
FIG. 7C is a cross-sectional view taken along the central plane of the MFP in the front and rear direction, illustrating the components including the sheet holder cover located at a second position.
Figure 8A:
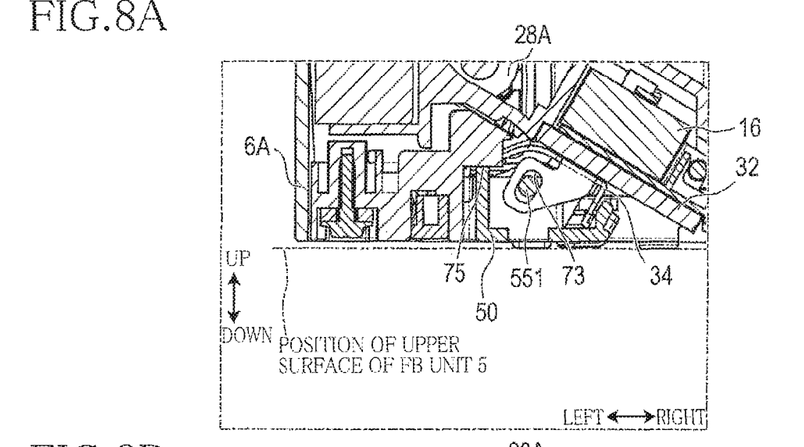
FIG. 8A is a cross-sectional view taken along a plane extending transversely through a front end portion of the MFP, illustrating the components including the sheet holder cover located at the first position.
Figure 8B:
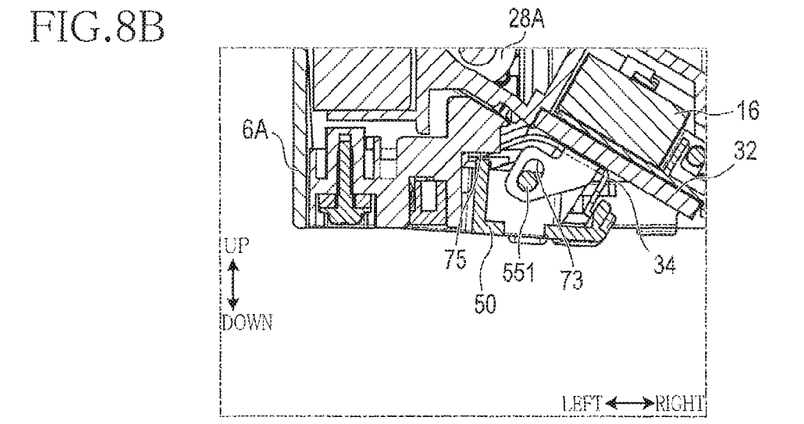
FIG. 8B is a cross-sectional view taken along the plane extending transversely through the front end portion of the MFP, illustrating the components including the sheet holder cover located at the third position.
Figure 8C:
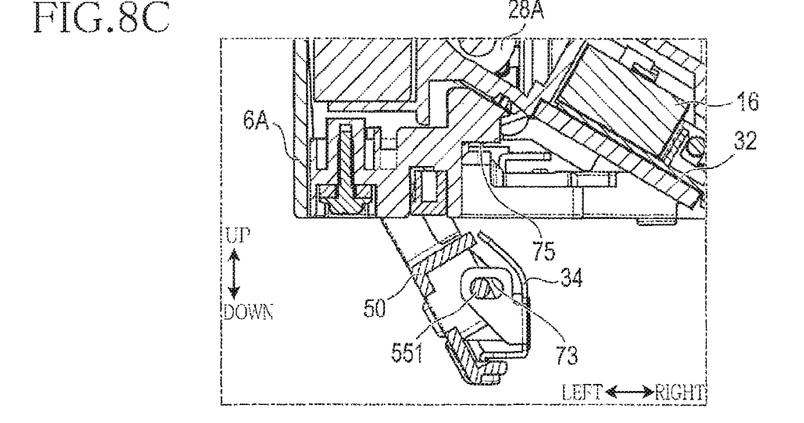
FIG. 8C is a cross-sectional view taken along the plane extending transversely through the front end portion of the MFP, illustrating the components including the sheet holder cover located at the second position.

The pivot shafts 511, 512 are provided respectively on opposite end portions of the sheet holder cover 50 in a widthwise direction of the sheet, i.e., the front and rear direction. The sheet holder cover 50 is supported at these pivot shafts 511, 512 by a base 6A of the ADF unit 6 such that the sheet holder cover 50 is pivotable with respect to the base 6A between a first position (see FIGS. 7A and 8A) and a second position (see FIGS. 7C and 8C). FIGS. 7A-7C are cross-sectional views taken along a central plane of the MFP 1 in the front and rear direction (noted that this plane is the same cross section as in FIGS. 2 and 3). FIGS. 8A-8C are cross-sectional views taken along line a plane at a position at which one end (i.e., a front end) of the second sheet holder 34 is viewable.

The sheet holder cover 50 has one (right) end 501 and the other (left) end 502. The one end 501 is nearer to the pressing member 38 than the other end 502. In the state in which the sheet holder cover 50 is located at the first position, a pivot axis about which the sheet holder cover 50 pivots is located nearer to the other end 502 than to the one end 501. When the sheet holder cover 50 pivots from the first position toward the second position, the one (right) end 501 is moved away from the base 6A of the ADF unit 6.

When mounting the front and rear pivot shafts 511, 512 respectively onto front and rear bearings, not illustrated, provided on the base 6A, the rear pivot shaft 512 is first inserted into the rear bearing. As indicated by the arrow A1 in FIG. 9A, the front pivot shaft 511 is moved upward from an opening 63 and then moved leftward in the state in which the pivot shaft 512 is supported by the rear bearing. Thereafter, as illustrated in FIG. 9B, a stopper 64 independent of the base 6A is fitted into the opening 63 to fill the opening 63, and the stopper 64 is fastened to the base 6A by a screw 65, so that mounting of the sheet holder cover 50 is completed.

Here, as illustrated in FIGS. 5, 6A, and 6B, the front and rear first support shafts 531, 532 are respectively provided with front and rear return springs 611, 612 each as one example of a first urging member. Each of the return springs 611, 612 is a torsion coil spring in the present embodiment. Before the sheet holder cover 50 is assembled to the base 6A, an arm 611A of the front return spring 611 is caught on the temporary assembly member 541. Likewise, an arm 612A of the rear return spring 612 is caught on the temporary assembly member 542.

As illustrated in FIG. 5, the temporary assembly member 541 includes: a portion extending leftward from a position between the pivot shaft 511 and the first support shaft 531: and a portion extending rearward from the leftward extending portion. The arm 611A is caught on the rearward extending portion. The temporary assembly member 542 includes: a portion extending leftward from a position between the pivot shaft 512 and the first support shaft 532: and a portion extending frontward from the leftward extending portion. The arm 612A is caught on the frontward extending portion.

In this state, the return springs 611, 612 are elastically deformed by some amount. Elastic forces of the respective return springs 611, 612 bring the arms 611A, 612A into pressing contact with the respective temporary assembly members 541, 542. As illustrated in FIG. 5, an arm 611B of the return spring 611 and an arm 612B of the return spring 612 are respectively held in pressing contact with arm receivers 661, 662 formed in the sheet holder cover 50.

As illustrated in FIGS. 6B and 6C, a rib 503 protrudes from the sheet holder cover 50. The rib 503 has a cutout 505 which is recessed upward from a lower surface of the rib 503. As illustrated in FIG. 6C, the arm receiver 661 is provided so as to define an upper end of the cutout 505. The arm 611B of the return spring 611 is urged upward and held in pressing contact with the arm receiver 661 at the upper end of the cutout 505.

As illustrated in FIG. 6B, a rib 504 protrudes from the sheet holder cover 50. Though not illustrated in FIG. 6B, the rib 504 has a cutout similar to the cutout 505. The arm receiver 662 defines an upper end of the cutout. The arm 612B of the return spring 612 is urged upward and held in pressing contact with the arm receiver 662 at the upper end of the cutout, not illustrated.

As described above, each of the arms 611A, 611B, 612A, 612B of the return springs 611, 612 is held in pressing contact with the corresponding portion. Thus, the arms 611A, 612A are not disengaged from the respective temporary assembly members 541, 542 unless the respective return springs 611, 612 are further deformed. This construction prevents the return springs 611, 612 from dropping off the respective first support shafts 531, 532.

Figure 9A:
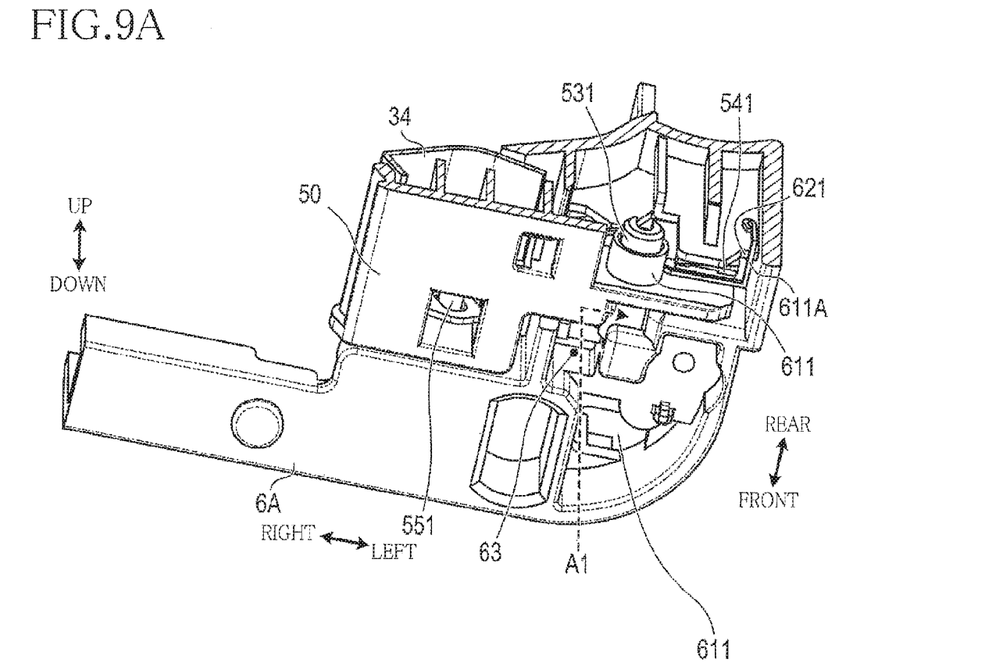
FIGS. 9A and 9B are views for explaining a procedure of assembly of the sheet holder cover.
Figure 9B:
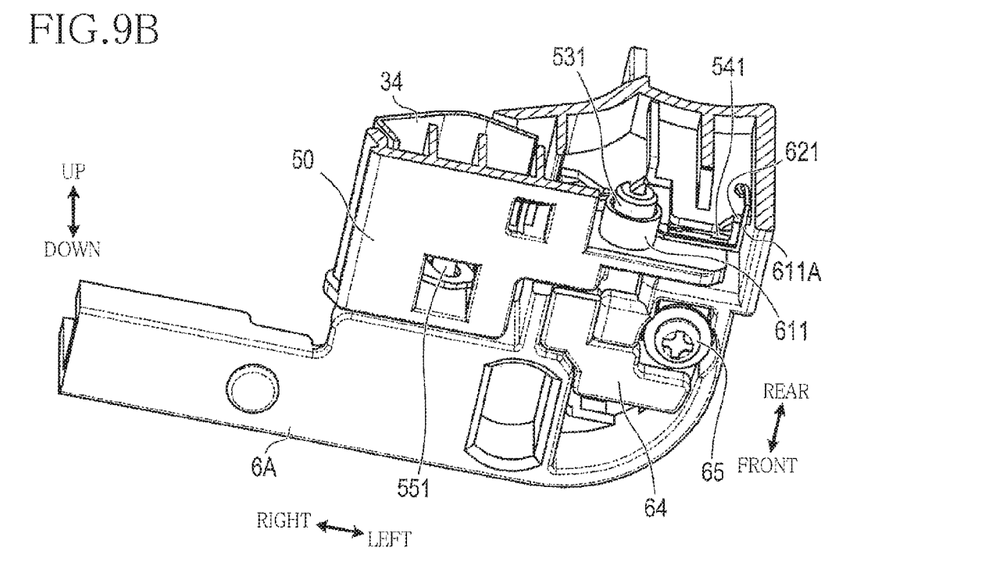

When assembling the sheet holder cover 50 to the base 6A, as illustrated in FIG. 9A, the arm 611A of the return spring 611 which is caught on the temporary assembly member 541 is brought into contact with an arm receiver 621 formed in the base 6A and is separated from the temporary assembly member 541. Likewise, the arm 612A of the return spring 612 which is caught on the temporary assembly member 542 is brought into contact with an arm receiver, not illustrated, of the base 6A and is separated from the temporary assembly member 542. That is, in a state in which the sheet holder cover 50 is assembled to the base 6A, the sheet holder cover 50 is held in a state in which the arm 611A of the return spring 611 and the arm 612A of the return spring 612 are held in contact with the respective arm receivers of the base 6A from below.

As a result, the return springs 611, 612 provided between the sheet holder cover 50 and the base 6A are deformed elastically so as to apply urging forces to the sheet holder cover 50. These urging forces urge the sheet holder cover 50 in a direction in which the sheet holder cover 50 pivot in a direction directed from the second position toward the first position. In this state, no load acts on the temporary assembly members 541, 542 from the respective return spring 611, 612.

The second sheet holder 34 is mounted on the second support shafts 551, 552. As illustrated in FIG. 6B, the second spring 36 is provided between the sheet holder cover 50 and the second sheet holder 34. The second spring 36 is fitted on a support projection 67 formed on the sheet holder cover 50 and is held at a particular position. A conductive member 36A extends from the second spring 36. The conductive member 36A is held at a specific position by holding pieces 691, 692 formed on the sheet holder cover 50.

The conductive member 36A is in contact with a metal component 71 (see FIG. 3). The metal component 71 is a metal member which is provided for reinforcing the base 6A. This metal component 71 prevents the base 6A from being distorted due to an urging force applied from the second pinch roller 28B. The metal component 71 is grounded to prevent buildup of static electricity. This construction prevents the metal component 71 and the second sheet holder 34 from being electrically connected to each other via the second spring 36 formed of metal, resulting in reduction in buildup of static electricity on the second sheet holder 34. It is noted that even when the sheet holder cover 50 pivots between the first position and the second position, the conductive member 36A is held in pressing contact with the metal component 71 while elastically deformed with the pivotal movement of the sheet holder cover 50, so that the conductive member 36A is kept in contact with the metal component 71.

As illustrated in FIGS. 8A-8C, the second support shaft 551 extends through an elongated hole 73 formed in the second sheet holder 34. Though not illustrated, the second support shaft 552 also extends through an elongated hole similar to the elongated hole 73. When an urging force of the second spring 36 acts on both of the sheet holder cover 50 and the second sheet holder 34, as illustrated in, e.g., FIG. 8C, the second sheet holder 34 is moved off the sheet holder cover 50 within a distance corresponding to a distance by which the second support shaft 551 and the elongated hole 73 are movable with each other.

Here, as described above, the sheet holder cover 50 is urged by the return springs 611, 612 so as to pivot in the direction directed from the second position toward the first position. Without other external forces being applied, the sheet holder cover 50 located at the second position illustrated in FIGS. 7C and 8C pivots in the counterclockwise direction in FIGS. 7A-8C so as to be moved to the third position illustrated in FIGS. 7B and 8B.

When the sheet holder cover 50 is moved to the third position, the second sheet holder 34 contacts the second ADF platen 32. In this state, the return springs 611, 612 urge the sheet holder cover 50 so as to further pivot in the counterclockwise direction. However, as described above, the second spring 36 is provided between the sheet holder cover 50 and the second sheet holder 34.

The second spring 36 has a spring constant which enables an appropriate urging force to be applied to the second ADF platen 32 when the sheet holder cover 50 is located at the first position illustrated in FIGS. 7A and 8A. It is noted that an excessively weak spring cannot press the sheet onto the second ADF platen 32 appropriately, and an excessively strong spring interferes with conveyance of the sheet.

The return springs 611, 612 prevent the sheet holder cover 50 from pivoting toward the second position by its own weight. Thus, even in the case where the user causes pivotal movement of the sheet holder cover 50 to the second position, the sheet holder cover 50 does not remain at the second position unless the user intentionally restrains the pivotal movement of the sheet holder cover 50. This construction reduces a possibility that the user moves the ADF unit 6 to the closed position in the state in which the sheet holder cover 50 is located at the second position.

The return springs 611, 612 do not require excessively large urging forces as long as the return springs 611, 612 are capable of achieving the above-described function. If the urging forces of the return springs 611, 612 are excessively large, on the contrary, the force causing the pivotal movement of the sheet holder cover 50 in one of opposite directions acts on the central portion of the sheet holder cover 50, and at the same time the force causing the pivotal movement of the sheet holder cover 50 in the other of opposite directions acts on the opposite end portions of the sheet holder cover 50. This situation leads to distortion (e.g., creep deformation) of the sheet holder cover 50 formed of resin. To solve this problem, the return springs 611, 612 have the urging force that overcomes the weight of the sheet holder cover 50.

With these constructions, when the sheet holder cover 50 reaches the third position, the return springs 611, 612 generate the urging force not enough to cause the sheet holder cover 50 to be lowered by its own weight and not enough to further compress the second spring 36, so that the sheet holder cover 50 is kept at the third position. That is, in the state in which the ADF unit 6 is located at the open position, the sheet holder cover 50 is not moved back toward the first position by a distance corresponding to an area in which a stroke of the sheet holder cover 50 is allowed, so that the sheet holder cover 50 is kept at the third position.

When the position of the ADF unit 6 is changed to the closed position in the state in which the sheet holder cover 50 is located at the third position, the sheet holder cover 50 is brought into contact with the upper surface of the FB unit 5. In this operation, a load acts on the second sheet holder 34 from the ADF unit 6 via the second ADF platen 32. This load compresses the second spring 36 between the sheet holder cover 50 and the second sheet holder 34, causing the sheet holder cover 50 to pivot to the first position illustrated in FIGS. 7A and 8A.

When the position of the sheet holder cover 50 is changed to the first position, as illustrated in FIG. 8A, the sheet holder cover 50 is brought into a contact portion 75 of the base 6A. The contact portion 75 is in contact with the sheet holder cover 50 near the return springs 611, 612. This construction prevents distortion (e.g., creep deformation) of the sheet holder cover 50 due to the urging force applied to the sheet holder cover 50 from the return springs 611, 612.

In the state in which the sheet holder cover 50 is in contact with the contact portion 75, the sheet holder cover 50 does not further pivots from the first position in a direction directed away from the second position. Thus, the load acting on the second sheet holder 34 from the second ADF platen 32 does not further increase, so that the second spring 36 is held in a state in which the second sheet holding spring 36 receives a designed load for compressing the second spring 36. That is, when the ADF unit 6 is located at the closed position, the position of the sheet holder cover 50 is appropriately changed to the first position, so that the second sheet holder 34 is held in pressing contact with the second ADF platen 32 at the appropriate load.

In the reading unit 3 as described above, when the ADF unit 6 is located at the closed position, the position of the sheet holder cover 50 is changed to the first position illustrated in FIGS. 7A and 8A. In this state, the pivotal movement of the sheet holder cover 50 to the second position is restrained by the FB unit 5. When the ADF unit 6 is located at the open position, the position of the sheet holder cover 50 is changed to the third position illustrated in FIGS. 7B and 8B. In this state, the restraint of the sheet holder cover 50 by the FB unit 5 is canceled, and thereby the position of the sheet holder cover 50 is changeable to the second position. Thus, the user may operate the sheet holder cover 50 to cause the sheet holder cover 50 to pivot to the second position illustrated in FIGS. 7C and 8C. In the case where the operation of the user is discontinued, the sheet holder cover 50 pivots toward the third position illustrated in FIGS. 7B and 8B, without the need for the user to change the position of the sheet holder cover 50 toward the first position manually in particular.

The protrusion 57 contacts the upper surface of the FB unit 5 when the ADF unit 6 is located at the closed position. This protrusion 57 is provided just on a back side from the second spring 36. Thus, a load acting on the sheet holder cover 50 from the second spring 36 is transmitted to the FB unit 5 via the protrusion 57. Accordingly, the load applied from the second spring 36 is receivable by the upper surface of the FB unit 5 whose stiffness is easier to increase than that of the sheet holder cover 50. This construction reduces creation of distortion of the sheet holder cover 50.

When operating the sheet holder cover 50, the user places his or her finger tip or finger tips in the recess 58. The recess 58 is formed in front of the center of the sheet holder cover 50 in the front and rear direction, making it easy for the user to place his or her finger tip in the recess 58. This recess 58 facilitates the operation of the user for changing the position of the sheet holder cover 50.

Effects

In the MFP 1 as described above, the second sheet holder 34 is mounted on the sheet holder cover 50. Thus, the second sheet holder 34 is moved away from the second ADF platen 32 by changing the position of the sheet holder cover 50 to the second position. Accordingly, in the case where a sheet jam occurs between the second sheet holder 34 and the second ADF platen 32, the user may change the position of the sheet holder cover 50 to the second position to remove the jammed sheet. In the case where the user wants to remove soil on the second ADF platen 32, the user may change the position of the sheet holder cover 50 to the second position to clean the second ADF platen 32.

When the ADF unit 6 is located at the closed position, the FB unit 5 restrains the pivotal movement of the sheet holder cover 50 to the second position. Thus, even when the ADF unit 6 is located at the closed position, the position of the sheet holder cover 50 is stabilized, and the second sheet holder 34 is functioned appropriately, unlike a construction in which the position of the sheet holder cover 50 is changeable to the second position.

The sheet holder cover 50 is provided so as not to overlap the pressing member 38 when viewed in the up and down direction. This construction eliminates the need for deforming the pressing member 38 when the position of the sheet holder cover 50 is changed between the first position and the second position. Accordingly, it is possible to prevent the pressing member 38 from being additionally curled, bent, creased, or wrinkled when the sheet holder cover 50 is opened and closed, unlike a construction in which the sheet holder cover 50 is provided so as to overlap the pressing member 38 when viewed in the up and down direction.

This MFP 1 includes the return springs 611, 612. Thus, when the position of the sheet holder cover 50 is changed to the second position, the sheet holder cover 50 pivots toward the first position, without the need for the user to change the position of the sheet holder cover 50 toward the first position manually in particular.

In this MFP 1, when the ADF unit 6 is located at the open position, the sheet holder cover 50 is kept at the third position without being forcibly returned to the first position. That is, the urging force of the return springs 611, 612 is not strong enough to overcome the urging force of the second spring 36. An excessively large urging force does not act on the sheet holder cover 50 from the return springs 611, 612, resulting in reduction in creation of distortion of the sheet holder cover 50. When the ADF unit 6 is located at the closed position, the position of the sheet holder cover 50 is changed to the first position against the urging force of the second spring 36. This construction allows the second spring 36 to apply a designed urging force to the second sheet holder 34.

In this MFP 1, the second spring 36 is conductive, and the second sheet holder 34 and the metal component 71 are electrically connected to each other, resulting in reduction in buildup of static electricity on the second sheet holder 34.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, while the MFP 1 includes the reading unit 3 as one example of the image reading apparatus and the ADF unit 6 as one example of the sheet conveyor in the above-described embodiment, an image scanner device having only an image scanning function may have the above-described configuration as the image reading apparatus.

What is claimed is:

1. An image reading apparatus, comprising:
a first unit; and
a second unit mounted on the first unit and movable between a closed position and an open position, the second unit covering an upper surface of the first unit when the second unit is located at the closed position,
wherein the first unit comprises:
a supporter, extending in a first direction and a second direction which are perpendicular to each other, that supports a reading object; and
a first image reader configured to read an image formed on the reading object supported by the supporter while moving along the supporter in the first direction,
wherein the second unit comprises:

a sheet conveyor that conveys a sheet along a conveyance path and comprises a sheet-discharger configured to discharge the sheet;

a pressing member, extending along the supporter in the first direction and the second direction, that presses, onto the supporter, the reading object supported by the supporter, when the second unit is located at the closed position;

a contact member that contacts the sheet conveyed by the sheet conveyor, the contact member comprising a first surface and a second surface that is a back of the contact member from the first surface;

a sheet holder opposed to the first surface of the contact member, with the conveyance path located therebetween;

a second image reader opposed to the second surface of the contact member, the second image reader being configured to read an image formed on the sheet conveyed by the sheet conveyor; and a cover movable between a first position and a second position and configured to hold the sheet holder, wherein when the cover is located at the first position, the cover covers the sheet holder and the contact member in a state in which the sheet holder is close to the contact member, and wherein when the cover is located at the second position, the sheet holder is spaced apart from the contact member, wherein when the second unit is located at the closed position, the pressing member is located at a position overlapping a position of each of the sheet-discharger and the supporter when viewed in a direction perpendicular to the pressing member, wherein when the second unit is located at the closed position, movement of the cover to the second position is limited by the first unit, and the cover is located at a position opposed to the first unit and not overlapping the position of each of the sheet-discharger, the supporter and the pressing member as viewed in the direction perpendicular to the pressing member when viewed in a vertical direction, and wherein when the second unit is located at the open position, the movement of the cover to the second position is not limited by the first unit.

2. The image reading apparatus according to claim 1, wherein when the second unit is located at the open position, the cover is movable to the second position.

3. The image reading apparatus according to claim 1, wherein the cover is pivotable with respect to a base of the second unit about a pivot axis that is parallel to a widthwise direction of the sheet which is perpendicular to a conveying direction in which the sheet is conveyed by the sheet conveyor, wherein one of opposite ends of the cover is nearer to the pressing member than another of the opposite ends of the cover, wherein when the cover is located at the first position, the pivot axis of the cover is nearer to the other of the opposite ends of the cover than to the one of opposite ends of the cover, and wherein when the cover pivots to the second position, the one of opposite ends of the cover is moved in a direction away from the base of the second unit.

4. The image reading apparatus according to claim 3, wherein the conveyance path comprises a curved portion, and wherein the pivot axis of the cover is located outside the curved portion when viewed in a direction perpendicular to the pressing member.

5. The image reading apparatus according to claim 1, further comprising a first urging member that urges the cover in a direction directed from the second position toward the first position.

6. The image reading apparatus according to claim 5, wherein the first urging member is disposed at each of opposite ends of the cover in a direction in which a pivot axis of the cover extends.

7. The image reading apparatus according to claim 1, wherein the contact member and the sheet holder are inclined with respect to a support surface of the supporter which supports the reading object.

8. The image reading apparatus according to claim 1, wherein the cover comprises an operation portion operable by a user when the user moves the cover.

9. The image reading apparatus according to claim 8, wherein the operation portion comprises one of a hole and a recess in which the user places a fingertip when moving the cover.

10. The image reading apparatus according to claim 1, wherein one of opposite ends of the cover overlaps the conveyance path when viewed in a direction perpendicular to the pressing member, and wherein another of the opposite ends of the cover does not overlap the conveyance path when viewed in the direction perpendicular to the pressing member.

11. An image reading apparatus, comprising:
a first unit; and
a second unit mounted on the first unit and movable between a closed position and an open position, the second unit covering an upper surface of the first unit when the second unit is located at the closed position,
wherein the first unit comprises:
a supporter that supports a reading object; and
a first image reader configured to read an image formed on the reading object supported by the supporter,
wherein the second unit comprises:
a sheet conveyor that conveys a sheet along a conveyance path;
a pressing member that presses onto the supporter, the reading object supported by the supporter, when the second unit is located at the closed position;
a contact member that contacts the sheet conveyed by the sheet conveyor, the contact member comprising a first surface and a second surface that is a back of the contact member from the first surface;
a sheet holder opposed to the first surface of the contact member, with the conveyance path located therebetween;
a second image reader opposed to the second surface of the contact member, the second image reader being configured to read an image formed on the sheet conveyed by the sheet conveyor;
a cover movable between a first position and a second position and configured to hold the sheet holder, wherein when the cover is located at the first position, the cover covers the sheet holder and the contact member in a state in which the sheet holder is close to the contact member, and wherein when the cover is located at the second position, the sheet holder is spaced apart from the contact member;
a first urging member that urges the cover in a direction directed from the second position toward the first position; and a second urging member that urges the sheet holder toward the contact member, wherein when the second unit is located at the closed position, movement of the cover to the second position is limited by the first unit, and the cover is located at a position opposed to the first unit and different from a position of the pressing member, and wherein when the second unit is located at the open position, the movement of the cover to the second position is not limited by the first unit, wherein when the second unit is located at the open position, the cover is located at a third position by being urged by the first urging member toward the first position and urged by the second urging member toward the second position, wherein the third position is located nearer to the first position than to the second position between the first position and the second position, and wherein when the second unit is moved to the closed position, the cover is moved to the first position against an urging force of the second urging member by being brought into contact with the first unit and receiving a load from the second unit.

12. The image reading apparatus according to claim 11, wherein the sheet holder is substantially a metal plate, and wherein the second urging member is formed of metal and interposed between the sheet holder and a metal member with a ground potential to electrically connect the sheet holder and the metal member to each other.

* * * * *